US012616222B2

(12) United States Patent　　　　(10) Patent No.: US 12,616,222 B2
Toyoshima et al.　　　　　　　　　(45) Date of Patent: May 5, 2026

(54) METHOD FOR MANUFACTURING REFINED EDIBLE OIL AND/OR FAT, METHOD FOR IMPROVING LIGHT EXPOSURE ODOR OF EDIBLE OIL AND/OR FAT, AND REFINED EDIBLE OIL AND/OR FAT

(71) Applicant: The Nisshin OilliO Group, Ltd., Tokyo (JP)

(72) Inventors: Takashi Toyoshima, Yokohama (JP); Shogo Tsujino, Yokohama (JP); Junichi Ikuina, Yokohama (JP); Kanji Aoyagi, Tokyo (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 913 days.

(21) Appl. No.: 17/627,419

(22) PCT Filed: Jul. 16, 2020

(86) PCT No.: PCT/JP2020/028612
§ 371 (c)(1),
(2) Date: Jan. 14, 2022

(87) PCT Pub. No.: WO2021/010491
PCT Pub. Date: Jan. 21, 2021

(65) Prior Publication Data
US 2022/0248700 A1　　Aug. 11, 2022

(30) Foreign Application Priority Data

Jul. 16, 2019　(JP) ................................. 2019-130820
Sep. 26, 2019　(JP) ................................. 2019-175917
Mar. 25, 2020　(JP) ................................. 2020-054350

(51) Int. Cl.
*A23D 9/04*　　　(2006.01)
*B01D 3/38*　　　(2006.01)
(Continued)

(52) U.S. Cl.
CPC ................. *A23D 9/04* (2013.01); *B01D 3/38* (2013.01); *C11B 3/08* (2013.01); *C11B 3/12* (2013.01)

(58) Field of Classification Search
CPC ............... A23D 9/04; B01D 3/38; C11B 3/12
See application file for complete search history.

(56) References Cited

U.S. PATENT DOCUMENTS

2007/0148310 A1* 6/2007 Murakami .............. C11B 3/001
　　　　　　　　　　　　　　　　　426/601
2014/0073807 A1* 3/2014 Arhancet ............. C11B 5/0007
　　　　　　　　　　　　　　　　　554/175

FOREIGN PATENT DOCUMENTS

CN　　104629912 A　　5/2015
CN　　109423353 A　　3/2019
(Continued)

OTHER PUBLICATIONS

"Empty 35 lb Oil Bottle for Packaging Food Oil". Available online at http://www.yankeecontainers.com. (Year: 2017).*
(Continued)

*Primary Examiner* — Erik Kashnikow
*Assistant Examiner* — Assaf Zilbering
(74) *Attorney, Agent, or Firm* — Morgan, Lewis & Bockius LLP

(57) ABSTRACT

The present invention is to provide a refined edible oil and/or fat whose light exposure odor has been improved, a method for manufacturing the oil and/or fat, and a method for improving light exposure odor of an edible oil and/or fat. Specifically, the present invention relates to a method for manufacturing a refined edible oil and/or fat which includes a step of bringing an oil and/or fat into contact with ozone and a distillation step. The refined edible oil and/or fat is manufactured by the method above.

17 Claims, 1 Drawing Sheet

(51) Int. Cl.
   *C11B 3/08*          (2006.01)
   *C11B 3/12*          (2006.01)

(56)                     References Cited

FOREIGN PATENT DOCUMENTS

JP            4798310  B1    10/2011
JP        2013-252129  A     12/2013
JP        2015-193776  A     11/2015
JP            6175003  B2     8/2017

OTHER PUBLICATIONS

Dunford., "Oil and Oilseed Processing III". Available online at
https://extension.okstate.edu/fact-sheets/oil-and-oilseed-processing-
iii.html on Jul. 2016. (Year: 2016).*
International Search Report issued in corresponding International
Patent Application No. PCT/JP2009/028612 dated Sep. 24, 2020.
Office Action issued in Chinese Patent Application No. 202080050462.8
dated Sep. 13, 2023.

* cited by examiner

[Fig.1]

UNDISTILLED OIL AND/OR FAT 6: OZONE 180 min

UNDISTILLED OIL AND/OR FAT 5: OZONE 60 min

UNDISTILLED OIL AND/OR FAT 4: OZONE 15 min

UNDISTILLED OIL AND/OR FAT 1: UNTREATED WITH OZONE 0.0       50000.0       100000.0       150000.0

■METHYLNONADIONE

※2,3-OCTANEDIONE

☐2-PENTYLFURAN

[Fig.2]

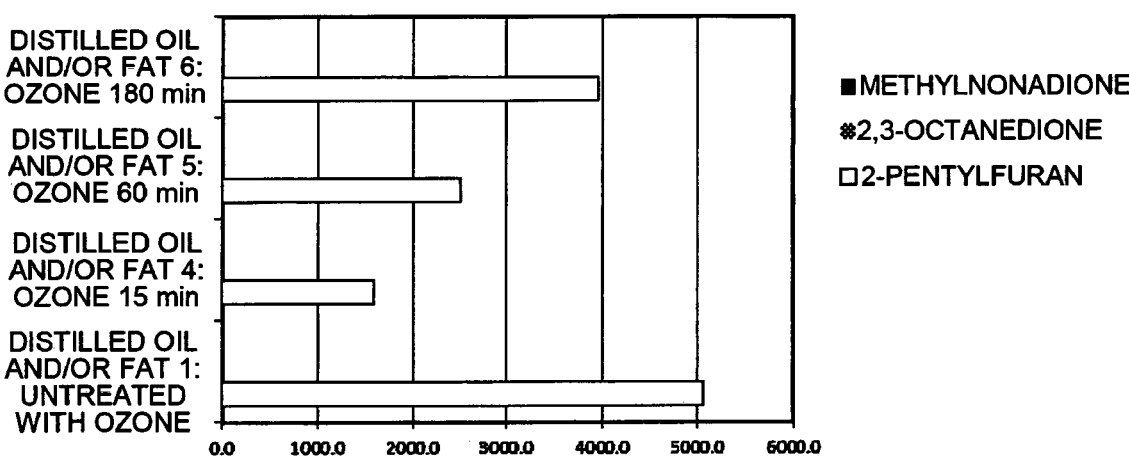

DISTILLED OIL AND/OR FAT 6: OZONE 180 min

DISTILLED OIL AND/OR FAT 5: OZONE 60 min

DISTILLED OIL AND/OR FAT 4: OZONE 15 min

DISTILLED OIL AND/OR FAT 1: UNTREATED WITH OZONE 0.0  1000.0  2000.0  3000.0  4000.0  5000.0  6000.0

■METHYLNONADIONE

※2,3-OCTANEDIONE

☐2-PENTYLFURAN

[Fig.3]

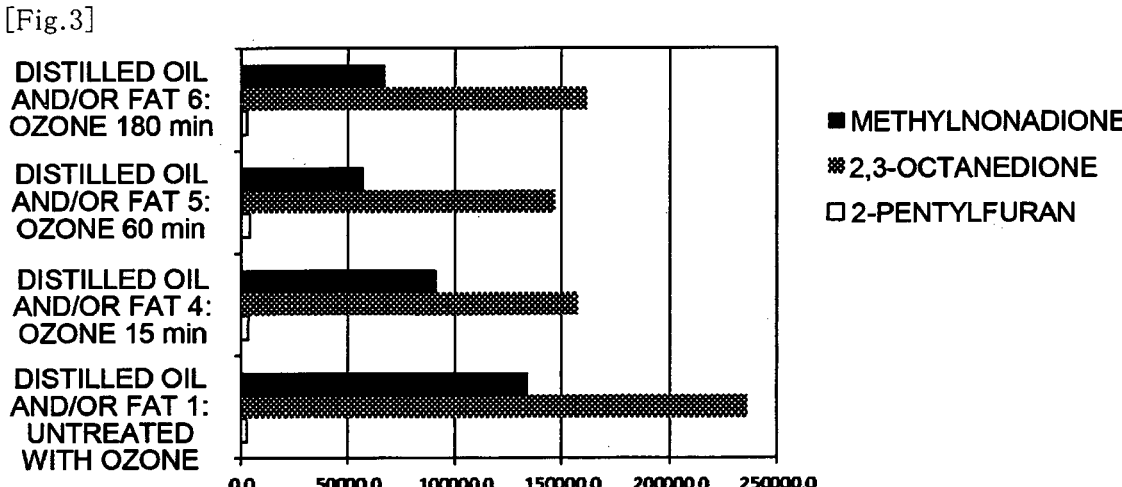

DISTILLED OIL AND/OR FAT 6: OZONE 180 min

DISTILLED OIL AND/OR FAT 5: OZONE 60 min

DISTILLED OIL AND/OR FAT 4: OZONE 15 min

DISTILLED OIL AND/OR FAT 1: UNTREATED WITH OZONE 0.0  50000.0  100000.0  150000.0  200000.0  250000.0

■METHYLNONADIONE

※2,3-OCTANEDIONE

☐2-PENTYLFURAN

METHOD FOR MANUFACTURING REFINED EDIBLE OIL AND/OR FAT, METHOD FOR IMPROVING LIGHT EXPOSURE ODOR OF EDIBLE OIL AND/OR FAT, AND REFINED EDIBLE OIL AND/OR FAT

TECHNICAL FIELD

The present invention relates to a method for manufacturing a refined edible oil and/or fat, a method for improving light exposure odor of an edible oil and/or fat, and a refined edible oil and/or fat. The light exposure odor means the odor of an edible oil and/or fat stored under light exposure condition.

BACKGROUND ART

It is known that an edible oil and/or fat is deteriorated in flavor by oxidation. Although it is thought that oxidation progresses by means of high temperature or light, since the quality of flavor of an oil and/or fat varies depending on the presence or absence of light, it is recognized that the causative material, mechanism, etc., of deteriorations in flavor due to light exposure are different from other oxidative deteriorations of an oil and/or fat. Edible oils and/or fats are distributed and sold in transparent containers and tend to be exposed to light during distribution and sales. In addition, heat-cooked products using edible oils and/or fats, such as fried foods and stir-fried foods, and edible oil and/or fat-containing products, such as dressing and mayonnaise, are also exposed to light during distribution and sales, and deterioration in flavor derived from the edible oil and/or fat occurs. In particular, in soybean oil, the deterioration in flavor due to exposure to light is severe, and improvement thereof has been demanded.

For example, Patent Literature 1 proposes a soybean oil-containing oil and/or fat composition whose odor from storage in a light place has been improved, containing arachidonic acid or the like.

CITATION LIST

Patent Literature

Patent Literature 1: Japanese Patent No. 6175003
Patent Literature 2: Japanese Unexamined Patent Application Publication No. 2015-193776

SUMMARY OF INVENTION

However, in the method of Patent Literature 1, since the additive (an arachidonic acid-containing oil and/or fat) having an effect of improving light exposure odor remains, there is a problem in that the flavor becomes different from the original flavor of the edible oil due to the influence of the flavor of the added arachidonic acid-containing oil and/or fat.

Accordingly, an object of the present invention is to provide an alternative method for manufacturing a refined edible oil and/or fat whose light exposure odor has been improved, a method for improving the light exposure odor of a refined edible oil and/or fat, and a refined edible oil and/or fat whose light exposure odor has been improved. More particularly, an object of the present invention is to provide a method for manufacturing a refined edible oil and/or fat which does not adversely impact the flavor of the refined product.

The present invention provides the following [1] to [22] for solving the above-described problems. The gist of the present invention for solving the above-mentioned problems is as follows:

[1] A method for manufacturing a refined edible oil and/or fat, wherein the method comprises the steps of:
- bringing an oil and/or fat into contact with ozone; and then
- distilling the oil and/or fat.

[2] The method for manufacturing a refined edible oil and/or fat according to aspects [1], wherein the distillation temperature in the distilling step is 120° C. to 260° C.

[3] The method for manufacturing a refined edible oil and/or fat according to aspects [1] to [2], wherein the distillation step is a reduced pressure steam distillation.

[4] The method for manufacturing a refined edible oil and/or fat according to any one of aspects [1] to [3], wherein the step of bringing an oil and/or fat into contact with ozone is a step of bubbling ozone gas into the oil and/or fat.

[5] The method for manufacturing a refined edible oil and/or fat according to any one of aspects [1] to [4], wherein the step of bringing an oil and/or fat into contact with ozone is carried out at a temperature at which the oil and/or fat is in a liquid state, e.g. a temperature of –10° C. or more.

[6] The method for manufacturing a refined edible oil and/or fat according to any one of aspects [1] to [5], wherein the step of bringing an oil and/or fat into contact with ozone is carried out at a temperature of 180° C. or less.

[7] The method for manufacturing a refined edible oil and/or fat according to any one of aspects [1] to [6], wherein the step of bringing an oil and/or fat into contact with ozone is a step of bringing an oil and/or fat and ozone into contact with each other for 1 minute or more.

[8] The method for manufacturing a refined edible oil and/or fat according to aspects [7], wherein the step of bringing an oil and/or fat into contact with ozone is a step of bringing an oil and/or fat and ozone into contact with each other for 2 minutes to 24 hours.

[9] The method for manufacturing a refined edible oil and/or fat according to any one of aspects [1] to [8], wherein the oil and/or fat is selected from the group consisting of soybean oil, rapeseed oil, high oleic rapeseed oil, sunflower oil, high oleic sunflower oil, olive oil, safflower oil, high oleic safflower oil, corn oil, cottonseed oil, rice oil, sesame oil, grapeseed oil, peanut oil, beef tallow, milk fat, fish oil, coconut oil, palm oil, and palm kernel oil.

[10] The method for manufacturing a refined edible oil and/or fat according to aspects [9], wherein the oil and/or fat comprises soybean oil in an amount of 10 to 100 mass %.

[11] The method for manufacturing a refined edible oil and/or fat according to any one of aspects [1] to [10], wherein the refined edible oil and/or fat is liquid at a temperature in the range of from 10° C. to 40° C.

[12] The method for manufacturing a refined edible oil and/or fat according to any of aspects [1] to [11], which further comprises one or more additional refining steps selected from the following: a degumming step, a neutralization step, a bleaching step, a dewaxing step, a deodorizing step, a separation step, and a blending step.

[13] The method for manufacturing a refined edible oil and/or fat according to any one of aspects [1] to [12], wherein the distilling step is effective to perform the deodorizing step of the oil and/or fat.

[14] The method for manufacturing a refined edible oil and/or fat according to any one of aspects [1] to [13], wherein the refined edible oil and/or fat is one whose light exposure odor has been improved.

[15] A method for manufacturing a packaged product which comprises the steps of:

manufacturing a refined edible oil and/or fat by the method according to any one of aspects [1] to [14]; and then packaging the refined edible oil and/or fat in a transparent container.

[16] A method for improving light exposure odor of a refined edible oil and/or fat, wherein the method comprises the steps of:

bringing an oil and/or fat into contact with ozone, and then distilling the oil and/or fat.

[17] A refined edible oil and/or fat obtained by the method for manufacturing the refined edible oil and/or fat according to any one of aspects [1] to [14].

[18] A packaged product comprising the refined edible oil and/or fat according to aspects [17] and a transparent container.

[19] An edible oil and/or fat-containing food product containing the refined edible oil and/or fat according to aspects [17], e.g. a dressing or mayonnaise.

[20] A heat-cooked food product prepared by cooking or part-cooking a food product in an edible oil and/or fat according to aspects [17], e.g. a fried food or a stir-fried food.

[21] The method for manufacturing a refined edible oil and/or fat according to aspects 2, wherein the distillation temperature is 120° C. to 230° C.

[22] A method for preparing an edible oil and/or fat-containing food product, the method comprising: manufacturing a refined edible oil and/or fat according to any one of aspects 1 to 15; and formulating the refined edible oil and/or fat into said food product, e.g. a dressing or a mayonnaise.

Advantageous Effects of Invention

According to the present invention, it is possible to provide a method for manufacturing a refined edible oil and/or fat whose light exposure odor is improved and a method for improving light exposure odor of a refined edible oil and/or fat by simple treatment. In addition, even if a refined edible oil and/or fat obtained with the present invention is stored under exposure to light for a long time, generation of unpleasant flavor is suppressed. Consequently, in refined edible oils and/or fats obtained with the present invention and also in processed foods (e.g.; heat-cooked products, mayonnaise, and dressing) manufactured using the refined edible oils and/or fats, light exposure odor derived from oils and/or fats is improved.

BRIEF DESCRIPTION OF THE DRAWINGS

FIG. 1 A graph showing comparison of volatile components of undistilled oils and/or fats (light-exposed products) brought into contact with ozone.

FIG. 2 A graph showing comparison of volatile components of distilled oils and/or fats (light-unexposed products) brought into contact with ozone.

FIG. 3 A graph showing comparison of volatile components of distilled oils and/or fats (light-exposed products) brought into contact with ozone.

DESCRIPTION OF EMBODIMENTS

The present inventors have found that a refined edible oil and/or fat prepared by bringing an oil and/or fat into contact with ozone and being distilled is suppressed in its generation of light exposure odor compared to usual refined edible oils and/or fats. Based on these findings, the present inventors have arrived at the completion of a method for manufacturing a refined edible oil and/or fat and a method for improving light exposure odor of a refined edible oil and/or fat according to the present invention. In this specification, the transitional phrases "comprising", "containing", "having", "including" and so on are treated as open-ended, but can be substituted by the phrases "consisting essentially of", "consisting of" or "consisting only of". In addition, any preferable alternatives can be combined even if said alternatives are exemplified, preferable, or more preferable embodiments.

The method for manufacturing a refined edible oil and/or fat and the method for improving light exposure odor of a refined edible oil and/or fat of the present invention will now be described in detail. Incidentally, in embodiments of the present invention, "A (numerical value) to B (numerical value)" means A or more and B or less.

<Method for Manufacturing Refined Edible Oil and/or Fat>

In the method for manufacturing a refined edible oil and/or fat of the present invention, an oil and/or fat is subjected to the step of being brought into contact with ozone and then to a distillation step. Although not wishing to be bound by theory, since light exposure odor is not improved when simple distillation at high temperature is merely performed, it is thought that the causative material of the light exposure odor is decomposed in the step of bringing an oil and/or fat into contact with ozone or in the distillation step after the contact of an oil and/or fat with ozone, and it is distilled off.

(Oil and/or Fat)

The oil and/or fat used in the present invention is not particularly limited and this may contain any known edible oil and/or fat as the main ingredient. As will be understood, the oil and/or fat will be one whose flavor and/or odor deteriorates on exposure to light. As the known oil and/or fat, animal and vegetable oils and/or fats, hydrogenated oils thereof, fractionated oils, and interesterified oils can be used alone or in combination. The animal or vegetable oil and/or fat may include, for example, soybean oil, rapeseed oil, high oleic rapeseed oil, sunflower oil, high oleic sunflower oil, olive oil, safflower oil, high oleic safflower oil, corn oil, cottonseed oil, rice oil, sesame oil, grapeseed oil, peanut oil, beef tallow, milk fat, fish oil, coconut oil, palm oil, and palm kernel oil. In general, although the flavor of an oil and/or fat is deteriorated by exposure to light, a solid oil and/or fat is clouded and is therefore less affected by exposure to light. Accordingly, an oil and/or fat that is in a liquid state during distribution or during storage (for example, at 10° C. to 40° C.) is preferred. In addition, in particular, an oil and/or fat containing soybean oil is easily affected by light exposure odor and can easily obtain the effects of the present invention. Accordingly, it is preferable to use an oil and/or fat containing soybean oil in an amount of 10 to 100 mass %; more preferably 50 to 100 mass %. Soybean oil having an iodine value of 110 to 140 or soybean oil of a high oleic acid variety (iodine value: 80 to 90) can also be used, although it is not particularly limited thereto. Incidentally, the iodine value can be measured based on "Standard Methods for the Analysis of Fats, Oils and Related Materials, 2.3.4.1-1996, Iodide value (Wijs-Cyclohexane Method)", The Japan Oil Chemists' Society.

As the oil and/or fat, an unrefined oil and/or fat or an oil and/or fat subjected to one or more refinement steps can be used. As the oil and/or fat subjected to one or more refinement steps, it is possible to use an oil and/or fat that has been subjected to any known refinement procedure, for example, a procedure involving one or more, or any or all, of a degumming step, a neutralization step, a bleaching step, a dewaxing step, and a deodorizing step.

(Ozone Treatment: Step of Bringing Oil and/or Fat into Contact with Ozone Gas)

The present invention includes a step of bringing an oil and/or fat into contact with ozone. It is thought that in this step, the causative material of the light exposure odor is decomposed or is changed to a compound that is easily decomposed by distillation. Ozone is a gas composed of three oxygen atoms and can be brought into contact with an oil and/or fat by bringing an ozone gas into contact with the oil and/or fat or by contacting (e.g. stirring) water containing ozone together with the oil and/or fat. Ozone gas means a gas containing ozone (and for example air, nitrogen, or oxygen), a gas consisting essentially of ozone, or a gas consisting of ozone. It is preferable to bring an ozone gas into contact with an oil and/or fat because there is no need to remove components other than ozone after the contact with the ozone gas. As the method for bringing an ozone gas into contact with an oil and/or fat, a method of bringing a degassed (deaerated) oil and/or fat into contact with an ozone gas and/or a method of bubbling an ozone gas into an oil and/or fat to bring the oil and/or fat into contact with ozone can be used. For example, the degassed oil and/or fat is obtained by degassing under reduced pressure. Incidentally, the ozone gas generating apparatus is not particularly limited, and an apparatus that generates an ozone gas by means of collision of oxygen molecules with high-energy electrons, such as UV irradiation in the air or oxygen or silent discharge in the air or oxygen, can be used. In addition, a commercially available apparatus that is used for sterilization, deodorization, or decolorization of water, food, etc. can be used.

The effect of improving light exposure odor increases as the contact time between an oil and/or fat and ozone increases, and the contact time is preferably 1 minute or more and more preferably 2 minutes to 24 hours. An oil and/or fat is more preferably retained in contact with ozone for 3 minutes to 6 hours and particularly preferably for 10 minutes to 2 hours. In addition, since an oil and/or fat is brought into contact with ozone, the contact temperature may be a temperature at which the oil and/or fat is in a liquid state, and is preferably −10° C. or more, and more preferably 5° C. or more. In addition, the oxidation reaction of an oil and/or fat is accelerated as the contact temperature increases, resulting in difficulty in controlling the reaction. Accordingly, the contact temperature is preferably 180° C. or less and more preferably 100° C. or less. The contact temperature is further preferably 10° C. to 60° C. and most preferably 10° C. to 40° C.

The amount of an ozone gas is not limited as long as the ozone gas can dissolve in an oil and/or fat, and the ozone is supplied during the contact time preferably in an amount of 0.0022 mass % or more based on the oil and/or fat, more preferably 0.006 mass % or more based on the oil and/or fat, further preferably 0.005 to 0.65 mass % based on the oil and/or fat, and most preferably 0.006 to 0.65 mass % based on the oil and/or fat.

Water content in the oil and/or fat would not make any influence on performance of the ozone treatment.

(Distillation Step)

The present invention includes a distillation step after the step of bringing an oil and/or fat into contact with ozone. The requirement that the distillation step is carried out after the step of bringing the oil and/or fat into contact with ozone is not intended to mean that the distillation step must be carried out immediately following the step of ozone treatment, although in some embodiments that may be the case. As discussed herein, one or more additional refinement steps may be carried out in respect of the oil and/or fat after the step of ozone treatment and prior to distillation. One or more of such steps may also be carried out prior to the step of ozone treatment.

The causative material of the light exposure odor is unclear, although fatty acids, such as linoleic acid, and furan derivatives are proposed. However, since it is thought that in the reaction with ozone, both compounds are decomposed or are changed to compounds that are readily decomposed by the distillation step, distillation is performed under conditions that these compounds can be distilled off. Incidentally, since any peroxide present in the oil and/or fat is decomposed at the high temperature (e.g. at a temperature above 160° C.), the distillation treatment may be performed at 160° C. or more. In addition, in reduced pressure or steam distillation, since the boiling point decreases, it is possible to perform distillation treatment at lower temperatures, for example at 120° C. or more. In the present invention, the distillation step preferably performs deodorization (reduced pressure steam distillation) that is carried out in refinement of an oil and/or fat. In contrast, since an oil and/or fat bears the risk of a reduction in quality if heated at high temperatures, the upper limit of the distillation temperature is preferably 260° C. or less. The distillation temperature is preferably 120° C. to 260° C., more preferably 140° C. to 260° C. or 160° C. to 260° C., and further preferably 180° C. to 260° C. or 200° C. to 260° C., and further preferably 220° C. to 255° C. or 220° C. to 260° C.

Incidentally, in the present invention, since the effect of improving light exposure odor is further improved (e.g. synergistically improved) by performing distillation at a low temperature, the distillation temperature is preferably 120° C. to 230° C., more preferably 160° C. to 230° C., further preferably 160° C. to 225° C. or 180° C. to 230° C., and further preferably 200° C. to 225° C.

The distillation can be performed under atmospheric pressure but is preferably performed under reduced pressure. The pressure is better the closer it is to vacuum and is preferably 50000 Pa or less, more preferably 8000 Pa or less, and further preferably 800 Pa or less. Since the reduced pressure is more preferable the closer it is to vacuum, the lower limit is not particularly limited. However, distillation is often performed at 10 Pa or more because of restrictions in the blowing of steam or equipment. The pressure is preferably 10 to 1000 Pa, more preferably 100 to 800 Pa, and further preferably 200 to 600 Pa.

In the present invention, steam distillation involving blowing steam during distillation is preferred. In this case, the amount of steam is preferably 0.5 to 10 mass % and more preferably 1 to 5 mass % based on the amount of the oil and/or fat.

A distillation time of 15 minutes or more is sufficient, and the distillation time is preferably 15 to 180 minutes and more preferably 30 to 120 minutes.

For example, distillation can be performed at 120° C. to 230° C. or 230° C. to 260° C. at 10 to 50000 Pa for 15 to 180 minutes with a steam amount of 0.5 to 10 mass % based on the amount of the oil and/or fat. In addition, distillation can be performed at 160° C. to 230° C. or 230° C. to 260° C. at 10 to 1000 Pa for 15 to 180 minutes with a steam amount of 0.5 to 10 mass % based on the amount of the oil and/or fat. In addition, distillation can be performed at 160° C. to 225°

7

C. or 230° C. to 260° C. at 100 to 800 Pa for 15 to 180 minutes with a steam amount of 0.5 to 5 mass % based on the amount of the oil and/or fat.

For example, distillation can be performed at 120° C. to 230° C. or 230° C. to 260° C. at 10 to 50000 Pa for 15 to 180 minutes without supplying steam. In addition, distillation can be performed at 160° C. to 225° C. or 230° C. to 260° C. at 100 to 800 Pa for 15 to 180 minutes without supplying steam.

For example, distillation can be performed at 160° C. to 230° C. or 230° C. to 260° C. at 50000 Pa to atmospheric pressure for 30 to 180 minutes with a steam amount of 0.5 to 10 mass % based on the amount of the oil and/or fat. In addition, distillation can be performed at 160° C. to 225° C. or 230° C. to 260° C. at 50000 Pa to atmospheric pressure for 30 to 180 minutes with a steam amount of 0.5 to 5 mass % based on the amount of the oil and/or fat.

At least one additional step may be performed between the above-described step (the step of bringing an oil and/or fat into contact with ozone) and the distillation step. In one embodiment, more than one additional step may be performed between the step of ozone treatment and the distillation step. The additional steps may include, for example, one or more steps selected from any of the following: a degumming step, a neutralization step, a bleaching step, a dewaxing step, a separation step, and a blending step. In addition, the reduced pressure steam distillation step as described herein is effective to perform a step of deodorizing an oil and/or fat. Thus, in some embodiments, the distillation step can effectively replace the deodorization step in a conventional refinement procedure. Accordingly, the above-described step (the step of bringing an oil and/or fat into contact with ozone) is preferably performed prior to the deodorizing step in the refinement of the oil and/or fat, and it is preferable to perform the deodorizing step together with the distillation step of the present invention.

<Method for Improving Light Exposure Odor of Edible Oil and/or Fat>

The method for improving light exposure odor of an edible oil and/or fat of the present invention is characterized by bringing an oil and/or fat into contact with ozone and performing distillation. The expression "improving light exposure odor" as herein described refers to a suppression of the increase in the odor of an edible oil and/or fat generated under light exposure condition. The improvement is with respect to the untreated edible oil and/or fat, i.e. the same edible oil and/or fat that has not been subjected to the ozone treatment method herein described but has otherwise been subjected to the same refinement procedure. The light exposure odor can be measured, for example based on the amount of some volatile components measured when the oil and/or fat is exposed to light of 1000 lux value for over 100 hours (preferably 108 hours or 120 hours). After exposure to light, the volatile components in the oil and/or fat is preferably less than 97% of the volatile components that has not been subjected to the ozone treatment but has otherwise been subjected to the same refinement procedure, preferably less than 95%, or less than 90%, more preferably less than 95%, or less than 90%, or less than 80%. The volatile components is preferably 2,3-Octanedione and/or 3-Methyl-2,4-nonadione. The oil and/or fat, the conditions for bringing the oil and/or fat into contact with ozone, the conditions for distillation, and so on are as described in the paragraph: <Method for manufacturing refined edible oil and/or fat>.

<Refined Edible Oil and/or Fat>

In the refined edible oil and/or fat of the present invention, the light exposure odor occurring on exposure to light is reduced by bringing an oil and/or fat into contact with ozone and further distilling the oil and/or fat. The oil and/or fat, the conditions for bringing the oil and/or fat into contact with ozone, the conditions for distillation, and so on are as described in the paragraph <Method for manufacturing refined edible oil and/or fat>. For example, in the case of soybean oil, in refined soybean oil subjected to the treatment above, odor components, 2,3-octanedione and 3-methyl-2, 4-nonadione, are reduced compared to refined soybean oil not subjected to the treatment. The refined oil and/or fat preferably contains soybean oil that has been brought into contact with ozone and further distilled in an amount of 10 to 100 mass % of the oil and/or fat and more preferably contains soybean oil subjected to the above-described treatment in an amount of 50 to 100 mass % of the oil and/or fat.

The refined edible oils and/or fats may be packaged, distributed and sold in containers such as plastic containers, metal containers, and transparent containers. In addition, the refined edible oils and/or fats may be formulated into food products, for example, seasoning, dressing, mayonnaise, and heat-cooked products such as fried foods and stir-fried foods.

EXAMPLES

The present invention will now be specifically described based on Examples but is not limited to the following Examples.

Test 1

<Sample>

[Undistilled Oil and/or Fat 1 and Distilled Oil and/or Fat 1]

Bleached soybean oil was used as undistilled oil and/or fat 1. 1.2 kg of bleached soybean oil (undistilled oil and/or fat 1) was deodorized (255° C., 533 Pa, 60 minutes, steam amount: 2.7% relative to oil and/or fat), and distilled oil and/or fat 1 was obtained.

[Undistilled Oil and/or Fat 2 and Distilled Oil and/or Fat 2]

An ozone gas (an air containing ozone) generated by an ozone generator (GL-3188A, manufactured by Shenzhen Guanglei Electonic Co., Ltd., ozone generation rate: 400 mg/h) was blown into 1.5 kg of bleached soybean oil (undistilled oil and/or fat 1) at room temperature from a glass tube having micropores for 0.25 minutes, and undistilled oil and/or fat 2 was obtained.

Furthermore, 1.2 kg of the undistilled oil and/or fat 2 was deodorized (255° C., 533 Pa, 60 minutes, steam amount: 2.7% relative to oil and/or fat), and distilled oil and/or fat 2 was obtained.

[Undistilled Oil and/or Fat 3 and Distilled Oil and/or Fat 3]

An ozone gas (an air containing ozone)) generated by an ozone generator (GL-3188A, manufactured by Shenzhen Guanglei Electonic Co., Ltd., ozone generation rate: 400 mg/h) was blown into 1.5 kg of bleached soybean oil (undistilled oil and/or fat 1) at room temperature from a glass tube having micropores for 3 minutes, and undistilled oil and/or fat 3 was obtained.

Furthermore, 1.2 kg of the undistilled oil and/or fat 3 was deodorized (255° C., 533 Pa, 60 minutes, steam amount: 2.7% relative to oil and/or fat) to prepare distilled oil and/or fat 3.

[Undistilled Oil and/or Fat 4 and Distilled Oil and/or Fat 4]

An ozone gas (an air containing ozone) generated by an ozone generator (GL-3188A, manufactured by Shenzhen Guanglei Electonic Co., Ltd., ozone generation rate: 400 mg/h) was blown into 1.5 kg of bleached soybean oil (undistilled oil and/or fat 1) at room temperature from a glass tube having micropores for 15 minutes, and undistilled oil and/or fat 4 was obtained.

Furthermore, 1.2 kg of the undistilled oil and/or fat 4 was deodorized (255° C., 533 Pa, 60 minutes, steam amount: 2.7% relative to oil and/or fat), and distilled oil and/or fat 4 was obtained.

[Undistilled Oil and/or Fat 5 and Distilled Oil and/or Fat 5]

An ozone gas (an air containing ozone) generated by an ozone generator (GL-3188A, manufactured by Shenzhen Guanglei Electonic Co., Ltd., ozone generation rate: 400 mg/h) was blown into 1.5 kg of bleached soybean oil (undistilled oil and/or fat 1) at room temperature from a glass tube having micropores for 60 minutes, and undistilled oil and/or fat 5 was obtained.

Furthermore, 1.2 kg of the undistilled oil and/or fat 5 was deodorized (255° C., 533 Pa, 60 minutes, steam amount: 2.7% relative to oil and/or fat), and distilled oil and/or fat 5 was obtained.

[Undistilled Oil and/or Fat 6 and Distilled Oil and/or Fat 6]

An ozone gas (an air containing ozone) generated by an ozone generator (GL-3188A, manufactured by Shenzhen Guanglei Electonic Co., Ltd., ozone generation rate: 400 mg/h) was blown into 1.5 kg of bleached soybean oil (undistilled oil and/or fat 1) at room temperature from a glass tube having micropores for 180 minutes, and undistilled oil and/or fat 6 was obtained.

Furthermore, 1.2 kg of the undistilled oil and/or fat 6 was deodorized (255° C., 533 Pa, 60 minutes, steam amount: 2.7% relative to oil and/or fat), and distilled oil and/or fat 6 was obtained.

<Light-Exposure Test 1-1>

Each of the distilled oils and/or fats 1 to 4 were put in respective 300-mL Erlenmeyer flasks and were exposed to light (1000 lux, 70 hours) from a fluorescent lamp, and the light exposure odors were evaluated. The results are shown in Table 1.

[Evaluation of Light Exposure Odor]

The odor of 40 g of an oil and/or fat put in a 100-mL beaker and heated to 120° C. was evaluated by 15 special panelists, and the average of points is shown in Table 1. Incidentally, in the evaluation, the heated odor of the light-exposed product of the distilled oil and/or fat 1 was evaluated as 10 points, and the odor of the light-unexposed product of the distilled oil and/or fat 1 not having light exposure odor was evaluated as 0 points.

TABLE 1

| | Ozone treatment condition | Deodorized condition | Evaluation of light exposure odor |
|---|---|---|---|
| Distilled oil and/or fat 1 (light-exposed product) | 0 min | 255° C. 533 Pa 60 min | 10 points |
| Distilled oil and/or fat 2 (light-exposed product) | 0.25 min (400 mg/h) R. Temp. | 255° C. 533 Pa 60 min | 9.8 points |
| Distilled oil and/or fat 3 (light-exposed product) | 3 min (400 mg/h) R. Temp. | 255° C. 533 Pa 60 min | 8.7 points * |
| Distilled oil and/or fat 4 (light-exposed product) | 15 min (400 mg/h) R. Temp. | 255° C. 533 Pa 60 min | 5.5 points * |

* indicates a significant difference (p <0.01).

It was confirmed from Table 1 that light exposure odor is improved by treatment with ozone. In particular, it was demonstrated that distilled oils and/or fats 3 and 4 have significant effects.

<Light-Exposure Test 1-2>

200 g of each of the oils and/or fats were put in respective 300-mL Erlenmeyer flasks and were exposed to light (1000 lux, 70 hours) of a fluorescent lamp, and the volatile components (odor components: 2-pentylfuran, 2,3-octanedione, and 3-methyl-2,4-nonadione) of each sample were analyzed. Incidentally, the evaluation was performed by comparing undistilled oils and/or fats 1 and 4 to 6 exposed to light (FIG. 1), distilled oils and/or fats 1 and 4 to 6 not exposed to light (FIG. 2), and distilled oils and/or fats 1 and 4 to 6 exposed to light (FIG. 3).

[Analysis of Amount of Odor Component in Oil and/or Fat]

10 to 50 mg of each of the oils and/or fats exposed to light were collected in respective 150-μL micro vials. The micro vials were placed in a glass insert for ATEX and were capped. Volatile components were generated under the following TDU/CIS conditions and were analyzed under the following GC-MS analysis conditions. The area values (area/mg) of 2-pentylfuran, 3-methyl-2,4-nonadione, and 2,3-octanedione per 1 mg of each oil and/or fat in chromatography obtained by GC-MS were compared in FIGS. 1 to 3.

<TDU•CIS Conditions>

Volatile components were eluted by heating with He: 50 mL/min at 250° C. for 10 minutes, and were adsorbed to Tenax TA cooled to −50° C. After 10 minutes, CIS 4 was heated up to 250° C. at 12° C./sec and volatile components were generated.

<GC-MS Analysis Conditions>

GC-MS apparatus: GC-MSD system (manufactured by Agilent Technologies, Inc.)

Column: DB-WAX (60 m×ϕ0.25 mm×0.5 μm)

Carrier gas: helium

Column temperature: 35° C. (holding for 5 minutes)→4° C./rain→180° C.→6° C./rain→250° C. (holding for 5 minutes)

MS detector: scan analysis (m/z=99, 71, 170)

Ion source: 230° C.

Quadrupole: 150° C.

Emission voltage: 70 eV

The following can be confirmed from FIGS. 1 to 3.

In oils and/or fats not exposed to light, although 2-pentylfuran was detected, 3-methyl-2,4-nonadione and 2,3-octanedione were not detected (FIG. 2). Furthermore, in FIG. 3, the levels of 2-pentylfuran detected were the same, which suggests that 2-pentylfuran does not contribute much to the difference in the light exposure odor of each sample.

Comparison of FIGS. 2 and 3 demonstrates that volatile components 3-methyl-2,4-nonadione and 2,3-octanedione increase by exposure to light, and it is thought that these components are components of the light exposure odor.

In addition, the components of light exposure odor, such as 3-methyl-2,4-nonadione and 2,3-octanedione decreased by contact with an ozone gas and distillation, and it was confirmed that there is a light exposure odor-reducing effect (FIG. 3).

In addition, as shown in FIG. 1, in oils and/or fats that have been only brought into contact with an ozone gas without being subjected to distillation, although there was a difference in 3-methyl-2,4-nonadione, 2,3-octanedione was not decreased, and improvement in odor components by exposure to light cannot be expected (FIG. 1).

Test 2

<Sample>

[Undistilled Oil and/or Fat 7 and Distilled Oil and/or Fat 7]

Bleached soybean oil (lot sample different from the undistilled oil and/or fat 1 of Test 1) was used as undistilled oil and/or fat 7. 1.2 kg of the bleached soybean oil (undistilled oil and/or fat 7) was deodorized (255° C., 533 Pa, 60 minutes, steam amount: 2.7% relative to oil and/or fat), and distilled oil and/or fat 7 was obtained.

[Undistilled Oil and/or Fat 8 and Distilled Oil and/or Fat 8]

1.5 kg of bleached soybean oil (undistilled oil and/or fat 7) and 1.5 kg of deionized water were placed in a tall beaker, and an ozone gas (an air containing ozone) generated by an ozone generator (OZSD-1200D: manufactured by Ebara Jitsugyo Co., Ltd., ozone concentration: 2 g/m³, flow rate: 0.005 m³/min, ozone generation rate: 600 mg/h) was blown thereinto at room temperature from a glass tube having micropores (installed at the bottom of the deionized water) for 60 minutes, and undistilled oil and/or fat 8 was obtained. Incidentally, the loading dose of ozone per 1 kg of oil and/or fat was 400 mg/kg.

Furthermore, 1.2 kg of the undistilled oil and/or fat 8 was deodorized (255° C., 533 Pa, 60 minutes, steam amount: 2.7% relative to oil and/or fat), and distilled oil and/or fat 8 was obtained.

<Light-Exposure Test 2>

200 g of each of the oils and/or fats were put in respective 300-mL Erlenmeyer flasks and were exposed to light (1000 lux, 108 hours) of a fluorescent lamp, and the volatile components (odor components: 2,3-octanedione and 3-methyl-2,4-nonadione) of each sample were analyzed before and after the light exposure treatment as in the above-described [Analysis of amount of odor component in oil and/or fat]. The resulting area value (area/mg) of each area is shown in Table 2.

TABLE 2

| | Ozone treatment condition | De-odorized condition | | 2,3-Octane-dione | 3-Methyl-2,4-nona-dione |
|---|---|---|---|---|---|
| Distilled oil and/or fat 7 | 0 min | 255° C. 533 Pa 60 min | Before exposure to light | 5778 | 13993 |
| | | | After exposure to light | 1545123 | 159019 |
| Distilled oil and/or fat 8 | 60 min (600 mg/h) R. Temp. Moisture | 255° C. 533 Pa 60 min | Before exposure to light | 16346 | 50168 |
| | | | After exposure to light | 1111488 (71.9%) | 149906 (94.3%) |

* Each value in ( ) is a ratio of the area value in comparison with the untreated ozone sample (Distilled oil and/or fat 7, after exposure to light).

The following can be confirmed from Table 2.

Even when contact with an ozone gas was performed under moisture conditions and then distillation was performed, the components of light exposure odor, such as 3-methyl-2,4-nonadione and 2,3-octanedione, after exposure to light decreased as in the above-described test 1, and it was confirmed that there is a light exposure odor-reducing effect.

Test 3

<Sample>

[Undistilled Oil and/or Fat 9 and Distilled Oil and/or Fat 9]

Bleached soybean oil (lot sample different from the undistilled oils and/or fats 1 and 7 of Tests 1 and 2) was used as undistilled oil and/or fat 9. 1.2 kg of the bleached soybean oil (undistilled oil and/or fat 9) was deodorized (255° C., 533 Pa, 60 minutes, steam amount: 2.7% relative to oil and/or fat), and distilled oil and/or fat 9 was obtained.

[Undistilled Oil and/or Fat 10 and Distilled Oil and/or Fat 10]

An ozone gas (an air containing ozone) generated by an ozone generator (OZSD-1200D: manufactured by Ebara Jitsugyo Co., Ltd., ozone concentration: 2 g/m³, flow rate: 0.005 m³/min, ozone generation rate: 600 mg/h) was blown into 1.5 kg of bleached soybean oil (undistilled oil and/or fat 9) at 90° C. from a glass tube having micropores for 5 minutes, and undistilled oil and/or fat 10 was obtained. Incidentally, the loading dose of ozone per 1 kg of oil and/or fat was 3.3 mg/kg.

Furthermore, 1.2 kg of the undistilled oil and/or fat 10 was deodorized (255° C., 533 Pa, 60 minutes, steam amount: 2.7% relative to oil and/or fat), and distilled oil and/or fat 10 was obtained.

[Undistilled Oil and/or Fat 11 and Distilled Oil and/or Fat 11]

An ozone gas (an air containing ozone) generated by an ozone generator (OZSD-1200D: manufactured by Ebara Jitsugyo Co., Ltd., ozone concentration: 2 g/m³, flow rate: 0.005 m³/min, ozone generation rate: 600 mg/h) was blown into 1.5 kg of bleached soybean oil (undistilled oil and/or fat 9) at 110° C. from a glass tube having micropores for 5 minutes, and undistilled oil and/or fat 11 was obtained. Incidentally, the loading dose of ozone per 1 kg of oil and/or fat was 3.3 mg/kg.

Furthermore, 1.2 kg of the undistilled oil and/or fat 11 was deodorized (255° C., 533 Pa, 60 minutes, steam amount: 2.7% relative to oil and/or fat), and distilled oil and/or fat 11 was obtained.

<Light-Exposure Test 3>

50 g of each of the oils and/or fats were put in respective glass bottles (screw tube bottle No. 8, manufactured by Maruemu Corporation) and were exposed to light (1000 lux, 108 hours) of a fluorescent lamp, and the volatile components (odor components: 2,3-octanedione and 3-methyl-2, 4-nonadione) of each sample were analyzed before and after the light exposure treatment as in the above-described [Analysis of amount of odor component in oil and/or fat]. The resulting area value (area/mg) of each area is shown in Table 3.

TABLE 3

| | Ozone treatment conditions | Deodorized conditions | | 2,3-Octanedione | 3-Methyl-2,4-nonadione |
|---|---|---|---|---|---|
| Distilled oil and/or fat 9 | 0 min — | 255° C. 533 Pa 60 min | Before exposure to light | 23076 | 36231 |
| | | | After exposure to light | 1570384 | 443578 |
| Distilled oil and/or fat 10 | 5 min (600 mg/h) 90° C. | 255° C. 533 Pa 60 min | Before exposure to light | 17145 | 25037 |
| | | | After exposure to | 1522163 | 426424 |

TABLE 3-continued

| | Ozone treatment conditions | Deodorized conditions | | 2,3-Octanedione | 3-Methyl-2,4-nonadione |
|---|---|---|---|---|---|
| | | | light | (96.9%) | (96.1%) |
| Distilled oil and/or fat 11 | 5 min (600 mg/h) 110° C. | 255° C. 533 Pa 60 min | Before exposure to light | 14631 | 21302 |
| | | | After exposure to light | 1512074 (96.3%) | 386445 (87.1%) |

\* Each value in ( ) is a ratio of the area value in comparison with the untreated ozone sample (Distilled oil and/or fat 9, after exposure to light).

The following can be confirmed from Table 3.

Even when ozone treatment was performed at 90° C. or 110° C. for 5 minutes, the volatile components, such as 3-methyl-2,4-nonadione and 2,3-octanedione, after exposure to light were suppressed from increasing, and it was demonstrated that there is a light exposure odor-reducing effect.

Test 4

<Sample>

[Undistilled oil and/or fat 12 and distilled oil and/or fat 12]

1.5 kg of neutralized soybean oil (undistilled oil and/or fat 12-a) was subjected to bleach treatment (at 110° C. for 20 minutes, activated bleaching clay: 0.8 mass % relative to the oil), and bleached soybean oil (undistilled oil and/or fat 12-b) was obtained. The undistilled oil and/or fat 12-b was deodorized (255° C., 533 Pa, 60 minutes, steam amount: 2.7% relative to oil and/or fat), and distilled oil and/or fat 12 was obtained.

[Undistilled Oil and/or Fat 13 and Distilled Oil and/or Fat 13]

Ozone treatment was performed by blowing ozone generated by an ozone generator (OZSD-1200D: manufactured by Ebara Jitsugyo Co., Ltd., ozone concentration: 2 g/m³, flow rate: 0.005 m³/min, ozone generation rate: 600 mg/h) into 3.54 kg of neutralized soybean oil (undistilled oil and/or fat 12-a) at room temperature from a glass tube having micropores for 283 minutes. After the ozone treatment, bleaching treatment (110° C., 20 minutes, activated bleaching clay: 0.8 mass % relative to the oil) was performed, and bleached soybean oil (undistilled oil and/or fat 13) was obtained. Incidentally, the loading dose of ozone per 1 kg of oil and/or fat was 807 mg/kg.

Furthermore, 1.2 kg of the undistilled oil and/or fat 13 was deodorized (255° C., 533 Pa, 60 minutes, steam amount: 2.7% relative to oil and/or fat), and distilled oil and/or fat 13 was obtained.

[Distilled Oil and/or Fat 14]

1.2 kg of the undistilled oil and/or fat 13 was deodorized (220° C., 533 Pa, 60 minutes, steam amount: 2.7% relative to oil and/or fat), and distilled oil and/or fat 14 was obtained.

<Light-Exposure Test 4>

50 g of each of the oils and/or fats were put in respective glass bottles (screw tube bottle No. 8, manufactured by Maruemu Corporation) and were exposed to light (1000 lux, 120 hours) of a fluorescent lamp, and the volatile components (odor components: 2,3-octanedione and 3-methyl-2,4-nonadione) of each sample were analyzed before and after the light exposure treatment as in the above-described [Analysis of amount of odor component in oil and/or fat]. The resulting area value (area/mg) of each area is shown in Table 4.

TABLE 4

| | Ozone treatment conditions | Deodorized conditions | | 2,3-Octane-dione | 3-Methyl-2,4-nonadione |
|---|---|---|---|---|---|
| Distilled oil and/or fat 12 | 0 min — — | 255° C. 533 Pa 60 min | Before exposure to light | 141123 | 36853 |
| | | | After exposure to light | 1030136 | 170333 |
| Distilled oil and/or fat 13 | 283 min (600 mg/h) R. Temp. | 255° C. 533 Pa 60 min | Before exposure to light | 145530 | 51898 |
| | | | After exposure to light | 881984 (85.6%) | 114510 (67.2%) |
| Distilled oil and/or fat 14 | 283 min (600 mg/h) R. Temp. | 220° C. 533 Pa 60 min | Before exposure to light | 70899 | 51305 |
| | | | After exposure to light | 241835 (23.5%) | 91479 (53.7%) |

\* Each value in ( ) is a ratio of the area value in comparison with the untreated ozone sample (Distilled oil and/or fat 12, after exposure to light).

The following can be confirmed from Table 4.

Volatile components, such as 3-methyl-2,4-nonadione and 2,3-octanedione, were suppressed from increasing even when an ozone treatment was performed after the neutralized step and before the bleaching step, and there was a light exposure odor-reducing effect. In addition, in the deodorizing step after the ozone treatment, the increase in the volatile components, 3-methyl-2,4-nonadione and 2,3-octanedione, was more suppressed at a lower temperature, and it was demonstrated that there is a light exposure odor-reducing effect.

The results of Tests 1 to 4 demonstrate that in oils and/or fats of different lots, an increase in volatile components, such as 3-methyl-2,4-nonadione and 2,3-octanedione, by exposure to light can be suppressed through an ozone treatment and subsequent distillation treatment and there is a light exposure odor-improving effect. In addition, the ozone treatment may be after neutralization of oil (before the bleaching step) or bleaching of oil, and the effect is enhanced with a decrease in distillation temperature.

The invention claimed is:

1. A method for manufacturing a refined edible oil and/or fat, wherein the method comprises the steps of:
   bringing an oil and/or fat into contact with ozone; and then
   distilling the oil and/or fat.

2. The method for manufacturing a refined edible oil and/or fat according to claim 1, wherein the distillation temperature in the distilling step is 120° C. to 260° C.

3. The method for manufacturing a refined edible oil and/or fat according to claims 1, wherein the distillation step is a reduced pressure steam distillation.

4. The method for manufacturing a refined edible oil and/or fat according to claim 1, wherein the step of bringing an oil and/or fat into contact with ozone is a step of bubbling ozone gas into the oil and/or fat.

5. The method for manufacturing a refined edible oil and/or fat according to claim 1, wherein the step of bringing an oil and/or fat into contact with ozone is carried out at a temperature at which the oil and/or fat is in a liquid state.

6. The method for manufacturing a refined edible oil and/or fat according to claim 1, wherein the step of bringing an oil and/or fat into contact with ozone is carried out at a temperature of 180° C. or less.

7. The method for manufacturing a refined edible oil and/or fat according to claim 1, wherein the step of bringing an oil and/or fat into contact with ozone is a step of bringing an oil and/or fat and ozone into contact with each other for 1 minute or more.

8. The method for manufacturing a refined edible oil and/or fat according to claim 7, wherein the step of bringing an oil and/or fat into contact with ozone is a step of bringing an oil and/or fat and ozone into contact with each other for 2 minutes to 24 hours.

9. The method for manufacturing a refined edible oil and/or fat according to claim 1, wherein the oil and/or fat is selected from the group consisting of soybean oil, rapeseed oil, high oleic rapeseed oil, sunflower oil, high oleic sunflower oil, olive oil, safflower oil, high oleic safflower oil, corn oil, cottonseed oil, rice oil, sesame oil, grapeseed oil, peanut oil, beef tallow, milk fat, fish oil, coconut oil, palm oil, and palm kernel oil.

10. The method for manufacturing a refined edible oil and/or fat according to claim 9, wherein the oil and/or fat comprises soybean oil in an amount of 10 to 100 mass %.

11. The method for manufacturing a refined edible oil and/or fat according to claim 1, wherein the refined edible oil and/or fat is liquid at a temperature in the range of from 10° C. to 40° C.

12. The method for manufacturing a refined edible oil and/or fat according to claim 1, which further comprises one or more additional refining steps selected from the following: a degumming step, a neutralization step, a bleaching step, a dewaxing step, a deodorizing step, a separation step, and a blending step.

13. The method for manufacturing a refined edible oil and/or fat according to, wherein the distilling step is effective to perform the deodorizing step of the oil and/or fat.

14. The method for manufacturing a refined edible oil and/or fat according to previously presented claim 1, wherein the refined edible oil and/or fat is one whose light exposure odor has been improved.

15. A method for manufacturing a packaged product which comprises the steps of:
   manufacturing a refined edible oil and/or fat by the method according to claim 1; and then
   packaging the refined edible oil and/or fat in a transparent container.

16. A method for improving light exposure odor of a refined edible oil and/or fat, wherein the method comprises the steps of:
   bringing an oil and/or fat into contact with ozone, and then
   distilling the oil and/or fat.

17. The method according to claim 1, wherein the distilling is performed under a pressure of 10 to 1000 Pa.

* * * * *